No. 854,530. PATENTED MAY 21, 1907.
J. W. RICHLEY.
AUTOMOBILE.
APPLICATION FILED FEB. 25, 1907.
3 SHEETS—SHEET 1.
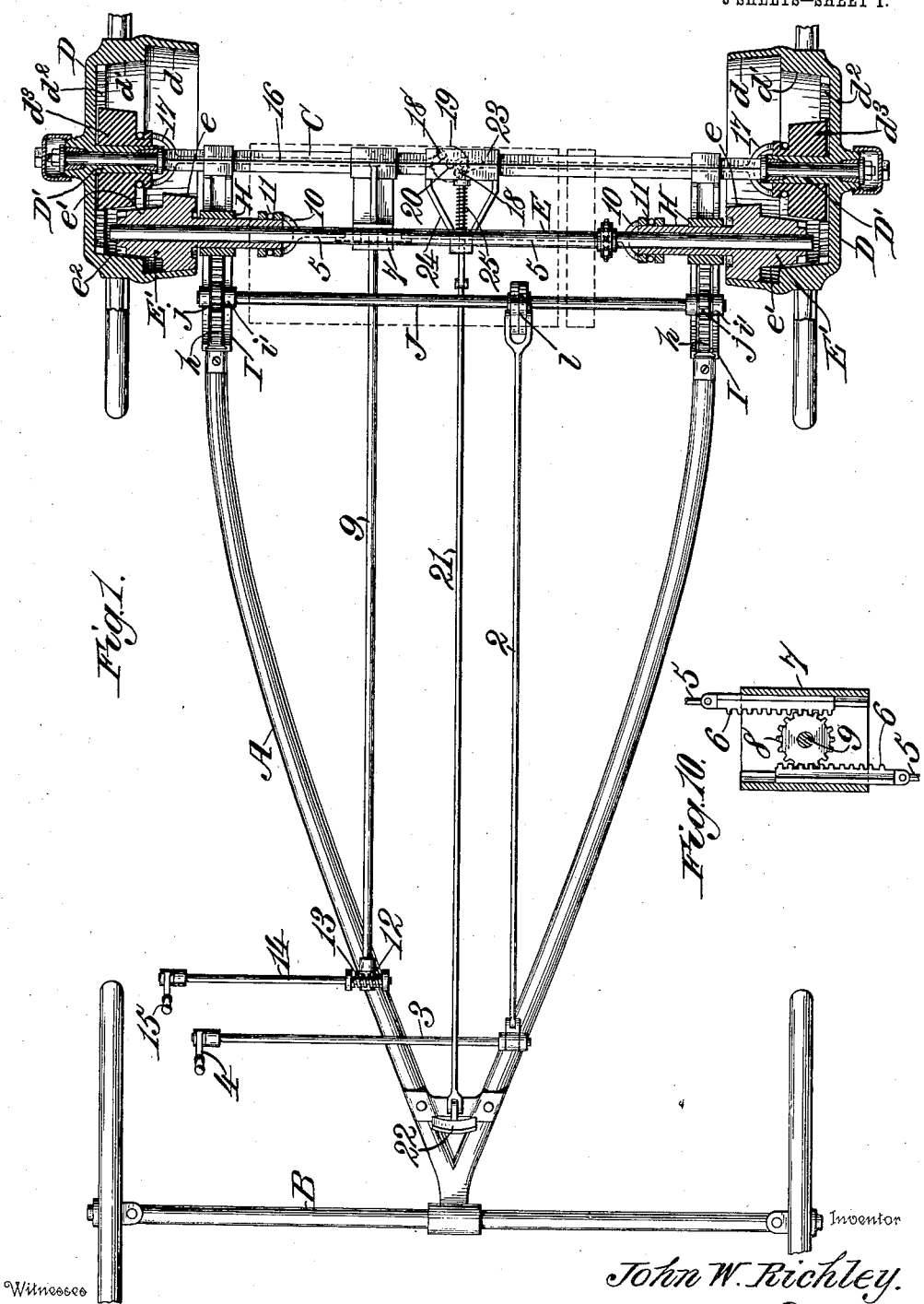

No. 854,530. PATENTED MAY 21, 1907.
J. W. RICHLEY.
AUTOMOBILE.
APPLICATION FILED FEB. 25, 1907.
3 SHEETS—SHEET 2.
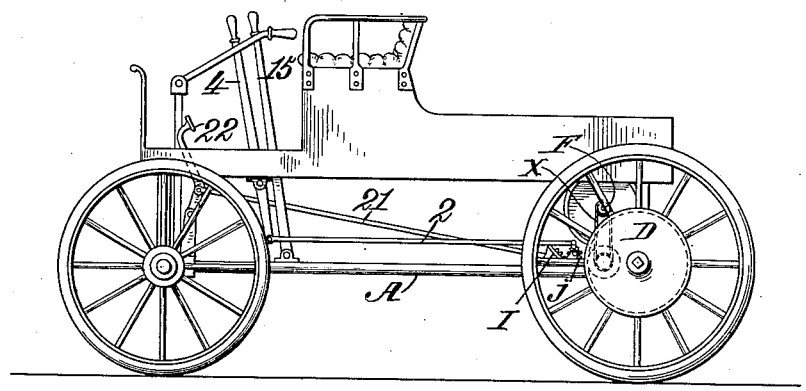
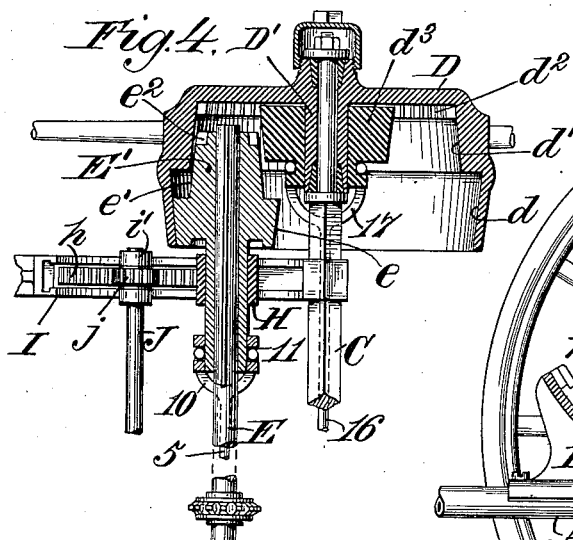
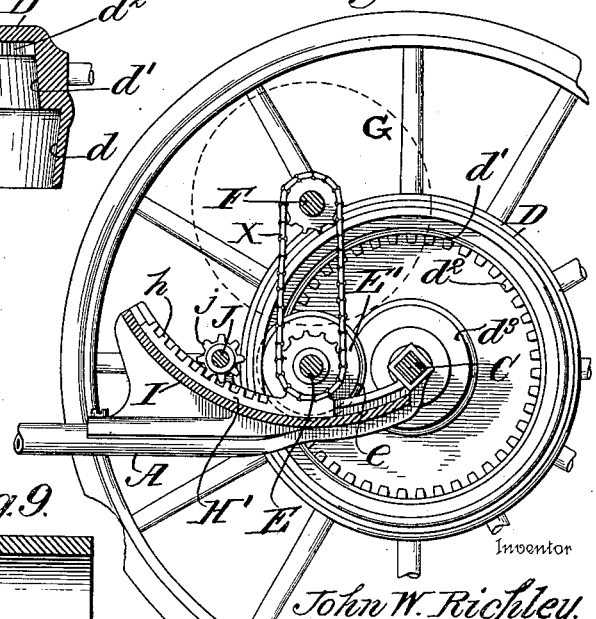
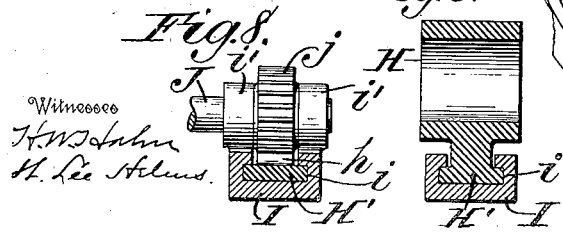
Witnesses
Inventor
John W. Richley
By
Attorney No. 854,530. PATENTED MAY 21, 1907.
J. W. RICHLEY.
AUTOMOBILE.
APPLICATION FILED FEB. 25, 1907.
3 SHEETS—SHEET 3.
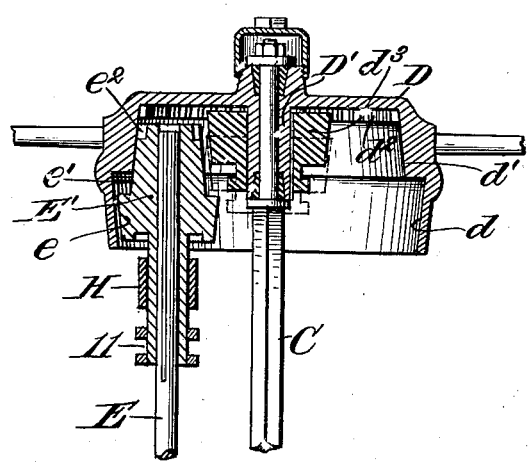
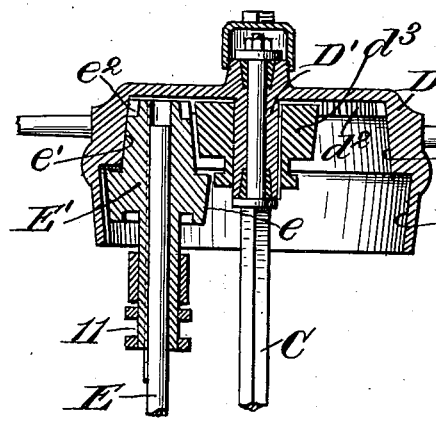
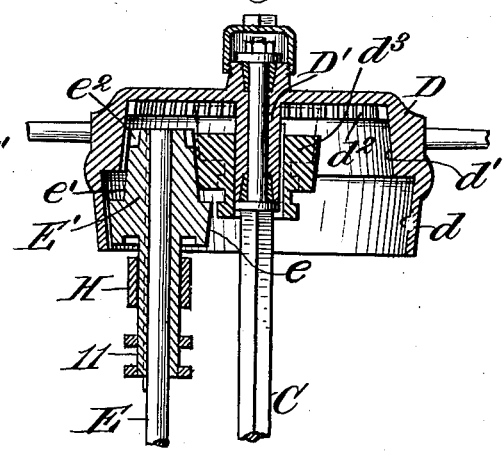
Witnesses
H. W. Hahn
H. Lee Helms
Inventor
John W. Richley.
By Marcellus Bailey
Attorney

UNITED STATES PATENT OFFICE.

JOHN W. RICHLEY, OF YORK, PENNSYLVANIA.

AUTOMOBILE.

No. 854,530.  Specification of Letters Patent.  Patented May 21, 1907.

Application filed February 25, 1907. Serial No. 359,253.

*To all whom it may concern:*

Be it known that I, JOHN W. RICHLEY, of York, in the county of York and State of Pennsylvania, have invented certain new and useful Improvements in Automobiles, of which the following is a specification.

My invention relates to means for driving the traction wheels of automobiles, and has more particular reference to that class of such vehicles in which the motor is adapted to run continuously when in use, being combined with means whereby it may be thrown into or out of operative connection with the traction wheels as desired.

My invention contemplates the employment of friction gearing for driving purposes, and the machine has been devised with that end in view. There is direct drive from the countershaft (which gets its motion from the motor shaft) to the traction wheels; the friction driving pinion on the countershaft extends within the hollow hub of the traction wheel and it engages friction faces with which the interior of the hub is provided; the friction faces in the interior of the hub for forward drive are frusto-conical in shape, are of different diameters for the purpose of obtaining different speeds according as the friction pinion engages one or the other, and are put together base to base, so that the two faces shall incline in opposite directions; the drive pinion on the countershaft has two corresponding frusto-conical faces of different diameters, and inclining in opposite directions to one another, so that by moving the drive pinion back or forth on its shaft, the selected one of its two drive faces can be brought opposite to and into engagement with its corresponding face within the hub—thus enabling me to bring one or the other of the two sets of friction faces into engagement by rectilinear movement only of the one member with relation to the other, on the line of the axis of revolution of the same.

There is also within the hub a frusto-conical friction face for reverse movement, adapted to engage, or be engaged with, the driving pinion when the latter is in neutral and inactive position with respect to the forward drive faces. And, finally, the interior of the hub is armed with a set of teeth arranged to form an internal toothed gear, which under certain conditions can be engaged by corresponding teeth on the low speed end of the driving pinion, whenever it is desirable to have a low speed positive drive, as for example in starting, or when the road is heavy, or when the vehicle is under much load. All of these coöperating parts, in compact and efficient form, are housed and contained within the compass of the hollow hub of the traction wheel driven thereby, secure and protected from injury, and yet readily accessible for renewal, repair or adjustment.

Mechanism embodying all of these features in their preferred form is represented in the accompanying drawings, in which—

Figure 1 is a plan of so much of the frame of an automobile as needed for the purposes of explanation, those parts of the same in which my invention is comprised being represented in horizontal section. Fig. 2 is a side elevation on reduced scale of an automobile embodying my invention. The remaining figures are on considerably larger scale. Fig. 3 is a sectional elevation on line 3—3 Fig. 1. Figs. 4, 5, 6, 7, are horizontal sections, in the plane of the axis of the hub, of one of the hubs and its contained parts, representing them in the several positions which they assume for forward and reverse drive, and for different forward speeds. Fig. 4 represents the parts in position for high forward speed. Fig. 5 represents the parts in position for low forward speed—friction drive. Fig. 6 represents the parts in position for low forward speed—positive drive. Fig. 7 represents the parts in position for reverse drive. Figs. 8 and 9 are sectional views of detached parts on lines 8—8 and 9—9 of Fig. 4, respectively. Fig. 10 is a sectional elevation of a detail hereinafter referred to.

In Fig. 1, A is a three point suspension frame; B is the front axle; and C is the rear axle, on which are mounted the traction wheels whose hubs are shown in section at D. The hubs are hollow, and are provided each with a central tubular spindle bearing D' which are mounted and adapted to revolve on the cylindrical end portions of the rear axle—which axle, between these end portions, is of square cross-section, as indicated in Figs. 3 and 4. The hubs D are alike, and they are driven by similar appliances. A description of one, therefore, will answer for both. The hollow hub D overhangs the axle. On the inner face of its band or circumferential wall, it has two frusto-conical surfaces $d$ $d'$ inclining in opposite directions, and of different diameters—the outer one $d'$ being of less diameter than the other. Between the surface $d'$ and the outer vertical wall of the hub, is a ring of cog teeth, forming an internal gear or spur wheel $d^2$, preferably cast in one with the body of the hub. The two surfaces $d\ d'$ are for forward friction drive— $d$ for high speed, $d'$ for low speed; and the internal gear $d^2$ is for low speed positive drive. Upon the tubular spindle bearing D' is mounted the frusto-conical friction wheel $d^3$ for reverse drive—said wheel having a longitudinal spline and groove connection with said spindle bearing, so that it may move lengthwise of, while revolving with, said spindle bearing.

E (Fig. 1) is the countershaft mounted to revolve in suitable bearings on the frame of the machine, and driven from the motor shaft F by some suitable intermediary, as the sprocket chain and gearing X shown in Fig. 3. The motor is typified by the dotted circle G, Fig. 3.

The ends of the countershaft extend into the hollow hubs, and on each of its ends is mounted a friction drive pinion E' united with the shaft by a spline and groove connection, which will permit the pinion to move lengthwise of the shaft while revolving with it. The friction drive pinion projects into the hub which it is to serve; it has two frusto-conical drive surfaces $e\ e'$ of different diameters set base to base and inclined in opposite directions the surface $e$ of larger diameter to act in coöperation with the concave drive surface $d$ of larger diameter in the hub for high speed, and the surface $e'$ of smaller diameter to coöperate with the concave surface $d'$ in the hub for low speed. On the small end of the friction pinion, beyond the surface $e'$, are teeth or cogs $e^2$ adapted (under conditions hereinafter described) to engage the internal gear $d^2$ in the hub, for low speed positive drive. The smaller tapered portion $e'$ of the friction drive pinion projects between the concave low speed surface $d'$ and the central friction wheel $d^3$ for reverse drive.

The countershaft is so located that the friction drive pinion can be brought into engaging contact with either one of the forward drive surfaces in the hub by a sliding movement of the pinion on its shaft. When the pinion is moved in one direction the high speed friction surface $e$ and $d$ will engage, as shown in Figs. 1 and 4; when moved in the opposite direction these two surfaces will be disengaged; and the low speed friction surfaces $e'\ d'$ will engage, as shown in Fig. 5. There is also an intermediate position of the friction drive pinion in which it will be out of engagement with either one of the forward drive surfaces $d\ d'$ in the hub, as seen in Fig. 7, this being necessary for reverse movement of the hub. After the drive pinion has been brought to this neutral position, wherein it can revolve freely and continuously as an idle wheel, without imparting any movement to the hub, all that is needed is to slide the reverse drive wheel $d^3$ from its normal position (shown in Fig. 5 and in dotted lines in Fig. 7) to the position shown in full lines Fig. 7, in which it is in engaging contact with the slow speed drive surface $e'$ of the friction drive pinion E'. At first sight it might seem that the engagement of the reverse drive wheel $d^3$ with the slow speed drive surface $e'$ would give higher speed than either one of the forward speeds. This indeed would be the case if the two engaged positively as toothed gears do, for example. But they have frictional engagement only and by regulating the pressure of the reverse drive wheel on its fellow wheel (by means of the pedal or foot lever 22 hereinafter referred to) as much slip between the two surfaces can be allowed as desired, with consequent diminution of reverse movement.

It remains now to describe how the toothed gears $e^2\ d^2$ for the forward low speed positive drive are brought into engagement. Referring to Fig. 5, in which the low forward speed friction surfaces $d'\ e'$ of the hub and drive pinion E' are in contact, while the toothed gears $d^2\ e^2$ are still out of engagement, it is manifest that the drive pinion cannot be advanced or pushed in a direction to cause its teeth $e^2$ to mesh with the teeth $d^2$ of the hub, without first retracting the countershaft far enough from the hub face $d'$ to permit the further advance of the pinion required for this purpose. After the countershaft has been thus retracted the driving pinion E' may then be further advanced or pushed into the hub, until its teeth $e^2$ are in mesh with the cogs or teeth $d^2$ of the hub, thus obtaining a slow speed forward positive drive. This slight receding movement of the countershaft may be provided for in various ways. I prefer to mount it in boxes which are mounted on a suitable portion of the frame, and are capable of movement back and forth in a plane at right angles to the axis of revolution of the countershaft. Two of such boxes—one for each end of the countershaft will be required, as indicated in Fig. 1. One of these boxes with its seat is shown more particularly in Figs. 3, 4, 8, 9.

H is the box (shown on enlarged scale in Fig. 9) having a base in the shape of a tongue H' which fits and is adapted to slide in a dovetail or undercut way $i$ in the seat I, which latter is mounted on the frame of the machine in any suitable manner—in the present instance being hung at its rear end of the square portion of the rear axle, and having its front portion bolted to one of the longitudinal side bars of the frame A. Both the tongue H' and the slide or way $i$ in which it moves are curved in the arc of a circle struck from the axis of the motor shaft as a center, to permit the back and forth movement of the countershaft box in the slide without disturbing the motion transmitting gearing between the motor shaft and the countershaft. As a convenient means of thus moving the box I provide the tongue H' on its upper face with a rack $h$ which is engaged by a pinion $j$ whose shaft J is mounted to revolve in boxes $i'$ on the seat I. There is of course one pinion $j$ for each box, the two pinions being mounted on one and the same shaft.

The shaft J can be actuated by any approved means. I have indicated for this purpose, without going into detail, a double pawl and ratchet device of known construction, the two ratchets 1 (the teeth of one reversed in position relatively to those of the other) being fast on the shaft J, and the pawls (one for each ratchet) being on the end of a crank arm swiveled on shaft J, and connected by a rod 2 to the crank shaft 3 of the operating lever 4 (Figs. 1 and 2). One or the other of the pawls is thrown into engagement with its ratchet according as it is desired to move the two boxes H in one direction or the other, as will be understood without further explanation.

The devices by which the friction drive pinions and the reverse drive wheels may respectively be actuated and adjusted in unison can be of any approved type. Those I have shown are merely for purposes of illustration, and are indicated to a large extent diagrammatically, in Fig. 1. The two friction drive pinions E' are connected by rods 5 shown in dotted lines in Fig. 1 which at their meeting ends are provided with racks 6 (Fig. 10) that enter and can move back and forth in guides in a box 7, mounted on the rear axle, in which is a pinion 8 fast on the rear end of a shaft 9. The racks engage the pinion on diametrically opposite sides thereof, so that a movement of the pinion in one direction will pull them inwardly, and in the other direction will push them outwardly. The outer ends of the rods 5 are forked, as at 10, to enter annular grooves 11 in the hubs of the friction drive pinion E whereby the rods can move the latter lengthwise without interfering with their rotary movement. The front end of shaft 9 has on it a worm wheel 12, engaged by a worm 13, on the operating shaft 14 provided with handle 15. By proportioning the parts properly, and giving the proper pitch to the thread of the worm, any desired range of movement of the rods 5 can be obtained. Similarly, to operate the friction reverse drive wheels $d^3$ in a direction lengthwise of the axle, I connect them by rods 16 (shown in dotted lines in Fig. 1), having yokes 17 at their outer ends to enter annular grooves in the wheels, and having their inner ends swiveled on eccentric pins 18, mounted in, and placed on opposite sides of the axis of, a disk 19 pivoted to turn upon an axis 20 and having a crank connection to a rod 21 operated by a foot lever 22. The box or frame 23 in which the disk 19 is mounted, has arms 24 supporting a guide bearing through which the rod 21 passes, and encircling the rod and confined between this bearing and a collar on the rod is a spiral spring 25 which tends to return the parts to the position from which they were moved by the foot lever. These adjusting devices as I have said are referred to merely for purposes of illustration. They are typical of many approved devices for similar uses known to the skilled mechanic acquainted with the art to which my invention relates.

The friction drive pinions E' are made preferably of a material such as vulcanized fiber. The friction faces $d$ $d'$ in the hub and the reverse drive wheel $d^3$ are made preferably of metal. I propose to provide the open face of each hub with a suitable hood or cover, preferably of aluminium, and detachably held in place.

It will be noted that practically all of the driving mechanism is housed within the hubs of the traction wheels, where it is in safe and protected position and yet readily accessible for purposes of adjustment, replacement or repair. The two frusto-conical friction drive surfaces of different diameters located base to base upon the interior of the band of the hub, whereby this interior is utilized, in connection with a drive pinion movable length wise on its actuating shaft, for a two speed forward friction drive, I believe to be new with me beyond its particular embodiment herein illustrated; as also the combination therewith of the lengthwise movable central frusto-conical friction wheel for reverse drive.

Having described my improvement and the best way now known to me of carrying the same into practical effect, I state in conclusion that I do not restrict myself to the structural details herein shown and set forth in illustration of my invention, since manifestly the same can be considerably varied without departure from the spirit of my invention: but

What I claim as new and desire to secure by Letters Patent is as follows:

1. In an automobile, a traction wheel having a hollow hub, two friction drive surfaces of different diameters upon the interior face of the circumferential wall of the hub, these surfaces being frusto-conical in contour and disposed base to base so as to incline in opposite directions, in combination with an actuating shaft, a friction drive pinion mounted thereon and provided with two frusto-conical friction drive surfaces of different diameters disposed base to base so as to incline in opposite directions, said friction drive pinion capable of sliding movement lengthwise of its actuating shaft, and arranged so that such movement thereon in one direction will bring its drive face of larger diameter in contact with the corresponding face of larger diameter in the hub, and, in the other direction will bring its drive face of smaller diameter in contact with the corresponding face of smaller diameter in the hub, substantially as and for the purposes hereinbefore set forth.

2. In an automobile, a traction wheel having a hollow hub, two friction drive surfaces frusto-conical in contour and of different diameters disposed base to base upon the interior face of the band or circumferential wall of the hub, an internal toothed gear within the hub and on the prolongation of the smaller end of the friction drive surface of smaller diameter, an actuating shaft, bearings therefor, and a friction drive pinion mounted on said shaft and provided with two frusto-conical drive surfaces of different diameters disposed base to base, and with teeth on the prolongation of the outer and smaller end of the surface of smaller diameter forming a toothed pinion, said friction drive pinion being capable of sliding movement upon its actuating shaft, to bring either its high or its low speed friction surface into contact with the corresponding friction face in the hub, and the bearings of the actuating shaft being movable and adjustable in a direction to vary the distance between the shaft and the hub, to permit the further advance of the friction drive pinion in a direction to put the teeth on its end in mesh with the internal toothed gear in the hub, substantially as and for the purposes hereinbefore set forth.

3. In an automobile, a traction wheel having a hollow hub upon the interior of the band or circumferential wall of which are two frusto-conical friction surfaces for forward drive, of different diameters for high and low speed respectively, disposed base to base so as to incline in opposite directions, a central tubular spindle-bearing forming part of the hub and mounted on the traction wheel axle, a reverse drive frusto-conical pulley or wheel mounted on said spindle-bearing in such manner that while revolving with, it may slide lengthwise of, the same, an actuating shaft, and a friction drive pinion mounted to revolve with, but to be capable of sliding lengthwise of, said shaft, and having two tapering reversely inclined friction drive surfaces of different diameters for high and low speed respectively, to coöperate with the corresponding forward drive surfaces in the hub, and having its smaller end portion extending into the space between the slow speed forward drive surface in the band of the hub and the central reverse drive wheel, the arrangement being such that when the friction drive pinion is in neutral position with respect to the forward drive surfaces in the hub, it may be brought into engagement with the central reverse drive wheel, by moving the latter toward the friction drive pinion, substantially as and for the purposes hereinbefore set forth.

In testimony whereof I affix my signature in presence of two witnesses.

JOHN W. RICHLEY.

Witnesses:
E. N. SPANGLER, JR.,
GEORGE L. HOLLAND.